United States Patent
Beck et al.

(10) Patent No.: US 11,492,979 B2
(45) Date of Patent: Nov. 8, 2022

(54) MECHANICAL REDUCTION GEAR FOR AIRCRAFT TURBOMACHINE

(71) Applicant: SAFRAN TRANSMISSION SYSTEMS, Colombes (FR)

(72) Inventors: Guillaume Julien Beck, Moissy-Cramayel (FR); Guillaume Pierre Mouly, Moissy-Cramayel (FR); Simon Loic Clement Lefebvre, Moissy-Cramayel (FR); Quentin Pierre Henri Pigott, Moissy-Cramayel (FR); Adrien Louis Simon, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 17/341,893

(22) Filed: Jun. 8, 2021

(65) Prior Publication Data

US 2021/0388769 A1 Dec. 16, 2021

(51) Int. Cl.
*F02C 7/36* (2006.01)
*F02C 7/06* (2006.01)

(52) U.S. Cl.
CPC .................. *F02C 7/36* (2013.01); *F02C 7/06* (2013.01); *F05D 2220/323* (2013.01); *F05D 2240/54* (2013.01); *F05D 2250/231* (2013.01); *F05D 2250/232* (2013.01); *F05D 2260/40311* (2013.01)

(58) Field of Classification Search
CPC ....................................... F02C 7/36; F02C 7/06
See application file for complete search history.

(56) References Cited

U.S. PATENT DOCUMENTS

2020/0332721 A1* 10/2020 Simon ....................... F02C 7/36

* cited by examiner

*Primary Examiner* — Derek D Knight
(74) *Attorney, Agent, or Firm* — Womble Bond Dickinson (US) LLP

(57) ABSTRACT

A mechanical reduction gear for turbomachine, in particular for aircraft. The reduction gear includes a sun gear having an axis of rotation, a ring gear which extends around the sun gear, planet gears which are meshed with the sun gear and the ring gear and which each includes a first toothing and a second toothing each including two series of teeth located on either side of a median plane, each of the planet gears being centred and guided in rotation by bearings, including an upstream bearing interposed axially between the series of upstream teeth of the second toothing and the plane, and a downstream bearing interposed axially between the series of downstream teeth of the second toothing and the plane.

12 Claims, 10 Drawing Sheets

MECHANICAL REDUCTION GEAR FOR AIRCRAFT TURBOMACHINE

TECHNICAL FIELD OF THE INVENTION

The present invention relates to the field of the mechanical reduction gears for turbomachines, in particular for aircraft.

BACKGROUND

The prior art comprises in particular the documents WO-A1-2010/092263, FR-A1-2 987 416, FR-A1-3 008 462, FR-A1-3 008 463, FR-A1-3 041 054, US-A1-2019/360356 and US-A1-2019/11039.

The role of a mechanical reduction gear is to change the speed and torque ratio between the input shaft and the output shaft of a mechanical system.

The new generations of multi-flow turbomachines, especially those with high bypass ratios, comprise a mechanical reduction gear to drive the shaft of a propeller, for example fan. Typically, the purpose of the reduction gear is to transform the so-called fast rotational speed of the shaft of a power turbine into a slower rotational speed for the shaft driving the fan.

Such a reduction gear comprises a central gear, called sun gear, a ring gear and gears called planet gears, which are engaged between the sun gear and the ring gear. The planet gears are held by a frame called planet carrier. The sun gear, the ring gear and the planet carrier are planetaries because their axes of revolution coincide with the longitudinal axis X of the turbomachine. The planet gears have different axes of revolution evenly distributed on the same operating diameter around the axis of the planetaries. These axes are parallel to the longitudinal axis X.

There are several reduction gear architectures. In the technique prior to the multi-flow turbomachines, the reduction gears are of the planetary or epicyclic type. In other similar applications, there are so-called differential or "compound" architectures.

In a planetary reduction gear, the planet carrier is fixed and the ring gear is the output shaft of the device which rotates in the opposite direction to the sun gear.

In an epicyclic reduction gear, the ring gear is fixed and the planet carrier is the output shaft of the device which rotates in the same direction as the sun gear.

On a compound reduction gear, no element is fixed in rotation. The ring gear rotates in the opposite direction to the sun gear and the planet carrier.

The reduction gears can be composed of one or more meshing stages. This meshing is achieved in different ways such as by contact, friction or magnetic fields. There are several types of contact meshing, such as straight, helical or herringbone toothing.

The increase in reduction ratios of the architectures of the target engines leads to the use of so-called "double stage" reduction gears. Indeed, beyond a ratio of the order of 6 or 7, the so-called "single-stage" technology loses its interest because it is no longer compact enough. So-called "double-stage" reduction gears must be used.

In a single-stage technology, the same toothing of a planet gear cooperates with the sun gear and the ring gear. In a two-stage technology, the toothing of the planet gear that cooperates with the sun gear is different from the toothing of the planet gear that cooperates with the ring gear. In general, the toothing of a planet gear that cooperates with the sun gear and the ring gear respectively have different average diameters.

The main problem with the double-stage reduction gears (each stage or toothing comprising a single series of teeth) lies in the fact that they are asymmetrical with respect to a plane perpendicular to the axis X. Thus, the power entering downstream from the inside and exiting upstream to the outside generates significant moments at the planet gears (the expressions "upstream" and "downstream" referring to the general flow of gases in the turbomachine).

One solution to this problem is to provide a symmetrical arrangement of the two toothing with respect to a plane perpendicular to the axis X (each stage or toothing comprising a double series of teeth). These two toothing are herringbone, i.e. they each comprise a series of upstream teeth separated axially from a series of downstream teeth. The upstream teeth are substantially parallel to each other and inclined with respect to the axis X. The downstream teeth are also substantially parallel to each other and inclined with respect to the axis X and with respect to the upstream teeth so that the upstream and downstream teeth form herringbones all around the planet gear. In a herringbone toothing, the helix angle of the two series of teeth has the same value (and an opposite inclination), so that these series of teeth generate opposite axial forces of the same value.

The planet gears of the reduction gear must be beard and guided in rotation with respect to the planet carrier. The conventional solutions for this are to use bearings. Several technologies are available, such as the plain bearings, the rolling bearings, etc. The integration of rolling bearings is not straightforward because the bearings must be arranged symmetrically around each planet gear and on either side of the aforementioned plane, which tends to increase the overall dimension of the reduction gear.

However, the engine environment in which the reduction gear must be integrated is constrained. Thus, the overall dimensions of the reduction gear, in particular axial, can lead to an elongation of the engine and therefore an increase in the drag and the mass of the engine, which reduces the performances of the latter. Similarly, the mass of the reduction gear has a negative influence on the performance of the system.

The purpose of the invention is therefore to provide a simple, effective and economical solution to minimise the overall dimension of the reduction gear and its mass in order to improve the overall performance of the engine equipped with this reduction gear.

SUMMARY OF THE INVENTION

The invention relates to a turbomachine mechanical reduction gear, in particular for an aircraft, this reduction gear comprising:
  a sun gear having an axis of rotation,
  a ring gear which extends around the sun gear,
  planet gears which are meshed with the sun gear and the ring gear and which are held by a planet carrier, each planet gear having an axis of rotation and comprising a first toothing with a mean diameter D1 for the meshing with the sun gear, and a second toothing with a mean diameter D2, which is different from D1, for the meshing with the ring gear,
  the first toothing comprising a series of upstream teeth and a series of downstream teeth which are located on either side of a plane perpendicular to the axis of rotation of the sun gear and passing substantially through the middle of the planet gear, the second toothing comprising a series of upstream teeth and a series of downstream teeth located on either side of said plane and separated from each other by said first toothing, each of the planet gears being centred and guided in rotation about its axis with respect to the planet carrier by rolling bearings located on either side of said plane, characterised in that an upstream bearing is interposed axially between the series of upstream teeth of the second toothing and said plane, and a downstream bearing is interposed axially between the series of downstream teeth of the second toothing and said plane.

Contrary to the prior art in which the bearings are located at the axial ends of the planet gears (and thus the first and second toothing are axially interposed between the bearings—in other words, each series of teeth of the second toothing is axially interposed between one of the bearings and the aforementioned plane), the invention proposes instead to mount each of the bearings for guiding a planet gear between a series of teeth of its second toothing and the aforementioned plane.

This configuration can greatly reduce the axial dimension of the planet carrier as well as the axial dimensions of the reduction gear. This is even more true when the bearings are of the rolling type in particular because the axial thickness of the rolling element is superimposed on the axial thickness of the toothing of the first stage.

The reduction gear according to the invention may comprise one or more of the following characteristics, taken in isolation from each other, or in combination with each other:

- each of the planet gears comprises a cylindrical body and an annular wall surrounding this body at a distance and connected to the latter by an annular web of material extending in the aforementioned plane, the series of teeth of the second toothing being located on end portions of said body and the series of teeth of the first toothing being located on the wall, this wall defining, on either side of the web and said plane, annular spaces in which the upstream and downstream bearings are at least partially housed;
- the planet carrier comprises two cylindrical edges, respectively upstream and downstream, located on either side of said plane, these cylindrical edges being housed in said annular spaces and used to support said upstream and downstream bearings;
- said upstream and downstream bearings are rolling bearings; the use of rolling bearings is advantageous because it enables a gain in overall dimension;
- each of the upstream and downstream rolling bearings comprises an inner rolling ring or an inner rolling track which is:
  fitted to the planet gear, or
  formed in one piece with the planet gear, or
  fitted to the planet carrier, or
  formed in one piece with the planet carrier;
- each of the upstream and downstream rolling bearings comprises an outer rolling ring or an outer rolling track which is:
  fitted to the planet gear, or
  formed in one piece with the planet gear, or
  fitted to the planet carrier, or
  formed in one piece with the planet carrier;
  the outer rolling ring or the outer rolling track of each of the bearings is fitted to or formed in one piece with said cylindrical wall;
- the upstream and downstream bearings have identical diameters which are smaller than the diameter of the first toothing and larger than the diameter of the second toothing;
- the planet carrier has an axial dimension which is between 20 and 80% of the axial dimension of the planet gears;
- the first toothing is herringbone-toothed and the second toothing is herringbone-toothed or straight-toothed; straight teeth are teeth that are parallel to each other and to the axis of rotation of the planet gear;
- the reduction gear is placed in a shell having a generally biconical shape, the reduction gear having a larger transverse dimension at said plane; the angle formed by the two conical sections of this shape is preferably less than or equal to 150°;
- the series of upstream teeth and the series of downstream teeth of the first toothing are separated from each other by an annular groove located in a plane.

In the present application, a herringbone-toothed toothing is defined as a toothing comprising two series of teeth oriented in different directions. The teeth of the first series are inclined with respect to the axis around which this first series extends, and the teeth of the second series are inclined differently with respect to its axis. The teeth of the two series are thus inclined to each other to form herringbones. The helix angle of the two series of teeth has the same value and an opposite inclination.

The invention further relates to a turbomachine, in particular for aircraft, comprising a mechanical reduction gear such as described above.

BRIEF DESCRIPTION OF FIGURES

Further characteristics and advantages will be apparent from the following description of a non-limiting embodiment of the invention with reference to the attached drawings in which.

DETAILED DESCRIPTION OF THE INVENTION

Figure 1:
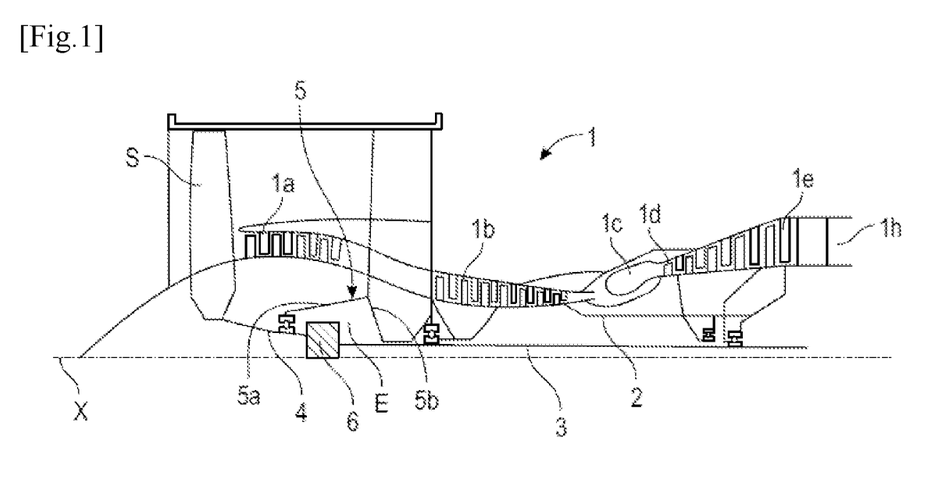
FIG. 1 is a schematic axial sectional view of a turbomachine using the invention.

FIG. 1 describes a turbomachine 1 which conventionally comprises a fan S, a low-pressure compressor 1a, a high-pressure compressor 1b, an annular combustion chamber 1c, a high-pressure turbine 1d, a low-pressure turbine 1e and an exhaust nozzle 1h. The high-pressure compressor 1b and the high-pressure turbine 1d are connected by a high-pressure shaft 2 and together form a high-pressure (HP) body. The low-pressure compressor 1a and the low-pressure turbine 1e are connected by a low-pressure shaft 3 and together form a low-pressure (LP) body.

The fan S is driven by a fan shaft 4 which is driven by the LP shaft 3 by means of a reduction gear 6. This reduction gear 6 is generally of the planetary or epicyclic type.

The following description relates to a reduction gear of the epicyclic type, in which the planet carrier and the sun gear are rotatable, the ring gear of the reduction gear being fixed in the engine reference frame.

The reduction gear 6 is positioned in the upstream part of the turbomachine. A fixed structure comprising schematically, here, an upstream part 5a and a downstream part 5b which makes up the engine casing or stator 5 is arranged so as to form an enclosure E surrounding the reduction gear 6. This enclosure E is here closed upstream by seals at the level of a bearing allowing the passage of the fan shaft 4, and downstream by seals at the level of the passage of the LP shaft 3.

Figure 2:
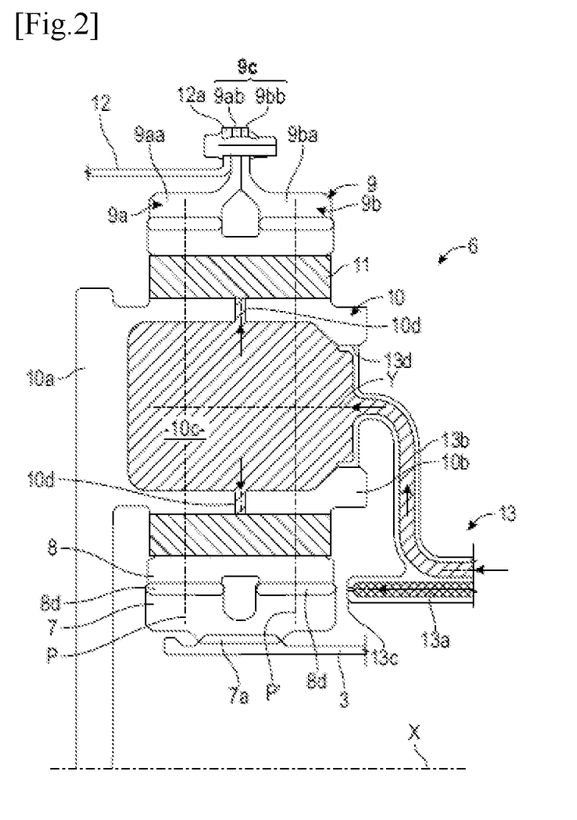
FIG. 2 is a partial axial sectional view of a single-meshing stage mechanical reduction gear, and illustrates the prior art of the present invention.

FIG. 2 shows an epicyclic reduction gear 6. On the input side, the reduction gear 6 is connected to the LP shaft 3, for example via inner splines 7a. Thus, the LP shaft 3 drives a planetary gear called the sun gear 7. Classically, the sun gear 7, whose axis of rotation is coincident with that of the turbomachine X, drives a series of gears called planet gears 8, which are evenly distributed on the same diameter around the axis of rotation X. This diameter is equal to twice the operating centre distance between the sun gear 7 and the planet gears 8. The number of planet gears 8 is generally defined between three and seven for this type of application.

The set of planet gears 8 is held by a frame called a planet carrier 10. Each planet gear 8 rotates around its own axis Y, and meshes with the ring gear 9.

At the output side we have:
In this epicyclic configuration, the set of the planet gears 8 rotate the planet carrier 10 around the axis X of the turbomachine. The ring gear is attached to the engine casing or stator 5 via a ring gear carrier 12 and the planet carrier 10 is attached to the fan shaft 4.
In another planetary configuration, the set of the planet gears 8 is held by a planet carrier 10 which is attached to the engine casing or stator 5. Each planet gear drives the ring gear which is fitted to the fan shaft 4 via a ring gear carrier 12.
In another differential configuration, the set of the planet gears 8 is held by a planet carrier 10 which is connected to a first fan shaft 5. Each planet gear drives the ring gear which is fitted to a second counter-rotating fan shaft 4 via a ring gear carrier 12.

Each planet gear 8 is freely rotatably mounted by means of a bearing 11, for example of rolling or hydrodynamic bearing type. Each bearing 11 is mounted on one of the shafts 10b of the planet carrier 10 and all the shafts are positioned relative to each other by means of one or more structural frames 10a of the planet carrier 10. There are a number of axes 10b and bearings 11 equal to the number of planet gears. For reasons of operation, assembly, manufacture, inspection, repair or replacement, the axes 10b and the frame 10a may be separated into several parts.

For the same reasons mentioned above, the toothing of a planet gear can be separated into several helixes or teeth each with a median plane P, P'. In our example, we detail the operation of a reduction gear in which each planet gear comprises two series of herringbone teeth cooperating with a ring gear separated into two half ring gears:

An upstream half-ring gear 9a comprising a rim 9aa and a securing half-flange 9ab. On the rim 9aa is the front helix meshed with a helix of the toothing 8d of each planet gear 8. The helix of the toothing 8d also meshes with that of the sun gear 7.

A downstream half-ring gear 9b comprising a rim 9ba and a securing half-flange 9bb. On the rim 9ba is the rear helix meshed with a helix of the toothing 8d of each planet gear 8. The helix of the toothing 8d also meshes with that of the sun gear 7.

Although the helix widths vary between the sun gear 7, the planet gears 8 and the ring gear 9 because of the toothing overlapping, they are all centred on a median plane P for the upstream teeth and on another median plane P' for the downstream teeth.

FIG. 2 thus illustrates the case of a single-meshing stage reduction gear, i.e. a same toothing 8d of each planet gear 8 cooperates with both the sun gear 7 and the ring gear 9. Even if the toothing 8d comprises two series of teeth, these teeth have the same average diameter and form a single toothing called herringbone.

The securing half-flange 9ab of the upstream ring gear 9a and the securing half-flange 9bb of the downstream ring gear 9b form the securing flange 9c of the ring gear. The ring gear 9 is attached to a ring gear carrier by assembling the securing flange 9c of the ring gear and the securing flange 12a of the ring gear carrier by means of a bolted assembly, for example.

The arrows in FIG. 2 describe the supply of the oil in the reduction gear 6. The oil enters into the reduction gear 6 from the stator part 5 into a distributor 13 by various means which will not be specified in this view as they are specific to one or more types of architecture. The distributor 13 comprises injectors 13a and arms 13b. The function of the injectors 13a is to lubricate the toothing and the function of the arms 13b is to lubricate the bearings. The oil is supplied to the injector 13a and exits through the end 13c to lubricate the toothing. The oil is also supplied to the arm 13b and circulates through the supplying inlet 13d of the bearing. The oil then flows through the shaft into a buffer zone or buffer zones 10c and then exits through the orifices 10d to lubricate the bearings of the planet gears.

Figure 3:
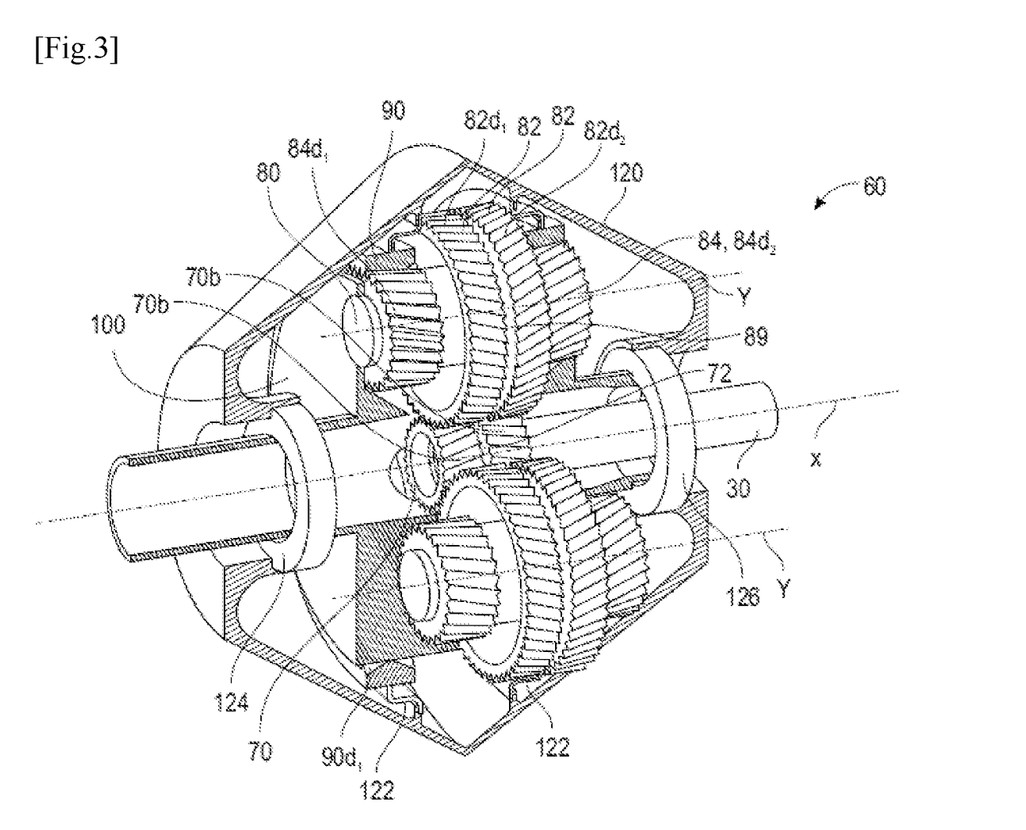
FIG. 3 is a partial axial sectional and perspective view of a double-meshing stage mechanical reduction gear, and illustrates the technique prior to the present invention.
Figure 4:
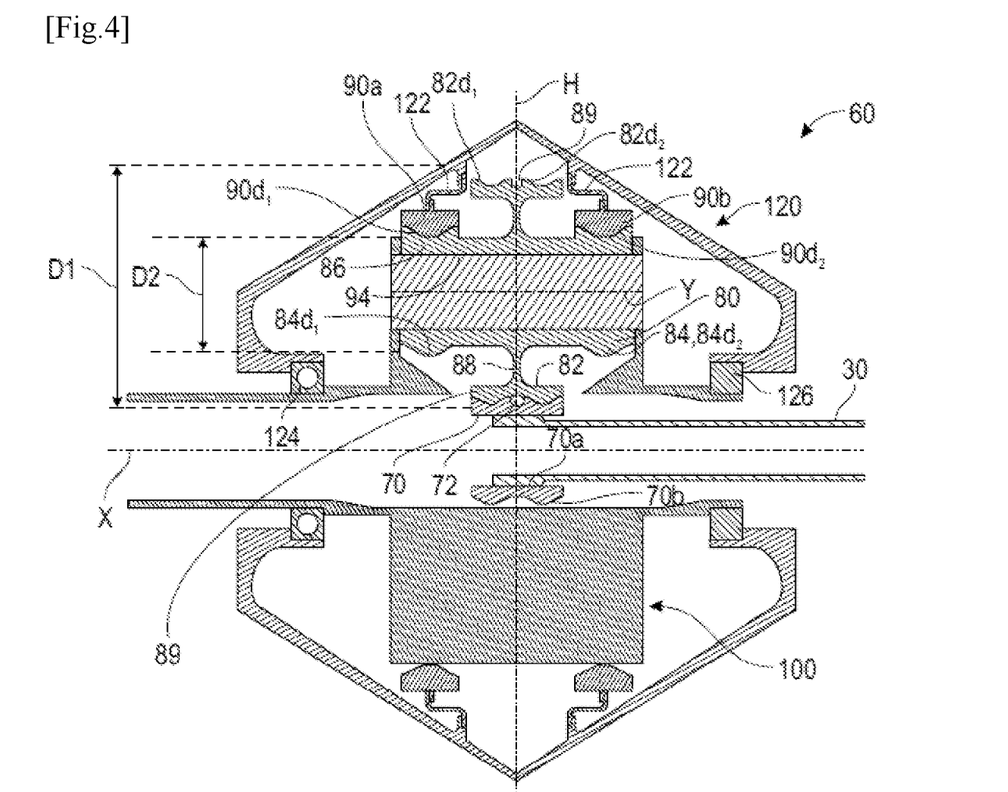
FIG. 4 is another schematic axial sectional view of the reduction gear of FIG. 3.

FIGS. 3 and 4 show another example of reduction gear architecture, known as a double meshing stage, which comprises:
a sun gear 70 having an axis of rotation X,
a ring gear 90 which extends around the sun gear and which is configured to be rotationally immovable about the axis X, and
planet gears 80 which are meshed with the sun gear 70 and the ring gear 90 and which are held by a planet carrier 100 which is configured to be rotatable about the axis X.

The plane H is defined as a median plane perpendicular to the axis X and passing substantially through the middle of the reduction gear 60 (FIG. 4).

The sun gear 70 comprises inner splines 70a for coupling with the LP shaft 30 as well as an outer toothing 70b for meshing with the planet gears 80. The toothing 70b have two series of adjacent herringbone-shaped teeth, separated from each other by an annular groove 72 oriented radially outwards. The toothing 70b is symmetrical with respect to the plane H, its teeth being located on either side of the plane H which passes through the groove 72.

The ring gear 90 is formed by two independent annulus 90a, 90b and comprises a toothing which is separated into two series of herringbone-shaped teeth 90d1, 90d2 supported respectively by the two annulus.

The annulus 90a, 90b are arranged symmetrically with respect to the plane H which thus extends between these annulus. The annulus are connected and attached to a ring gear carrier 120 by means of annular connecting flasks 122. The flasks 122 are independent of each other, each flask having a general S-shape in axial half-section providing it a certain radial flexibility by elastic deformation during operation.

Each annulus 90a, 90b extends around the axis X and is attached to the corresponding flask 122 by its outer periphery. Its inner periphery comprises one of the teeth 90d1, 90d2.

The ring gear carrier 120 has a generally annular shape around the axis X and is more particularly biconical. It thus comprises a first upstream section or left-hand side in the drawing, with an upstream end of smaller diameter, and a downstream end of larger diameter which is connected to the upstream end of larger diameter of the other section, downstream or right-hand side in the drawing. The larger diameter ends of the sections are thus connected to each other, and their smaller diameter ends form the axial ends of the ring gear carrier.

The upstream end of the ring gear carrier 120 extends around the planet carrier 100 or a shaft connected to the planet carrier, and is centred and rotatably guided on the planet carrier or the shaft by means of at least one bearing 124. Similarly, the downstream end of the ring gear carrier 120 extends around the planet carrier 100 or a shaft connected to that planet carrier, and is centred and rotatably guided on the planet carrier or the shaft via at least one further bearing 126.

As is the case with the ring gear 90, the ring gear carrier 120 is symmetrical with respect to the plane H which intersects the ring gear carrier in its middle and thus passes through the larger diameter ends of the aforementioned sections.

Each planet gear 80 comprises a first toothing 82 of average diameter D1 for meshing with the sun gear 70, and a second toothing 84 of average diameter D2, different from D1 and in particular smaller than D1, for the meshing with the ring gear 90. The average diameters are measured from the axis Y of each planet gear and represent the average between the maximum diameter and the minimum diameter of a toothing of this planet gear.

Each planet gear 80 comprises a cylindrical body 86, here tubular, and an annular web 88 extending substantially radially outwardly from the middle of this body 86. The web 88 connects the body 86 to an annular wall 91 which surrounds the body 86. The toothing 84 is separated into two series of herringbone teeth 84d1, 84d2 which are located respectively on the axial ends of the body 86. The toothing 82 comprises two series of herringbone teeth 82d1, 82d2 which are located at the outer periphery of the web 88 and in particular of the wall 91 and which are separated from each other by an annular groove 89 opening radially outwards with respect to the axis Y.

The toothing 82 is crossed in its middle by the plane H which passes through the groove 89, the teeth 82d1, 82d2 therefore being arranged on either side of the plane H. The teeth 84d1, 84d2 are also arranged symmetrically in relation to the plane H.

The toothing 82 and the outer periphery of the web 88 have an axial dimension which is less than the axial distance between the annulus 90a, 90b, as well as between the flasks 122, so that each planet gear 80 can rotate freely in the ring gear carrier 120 and between the annulus 90a, 90b and the flasks 122.

Figure 5:
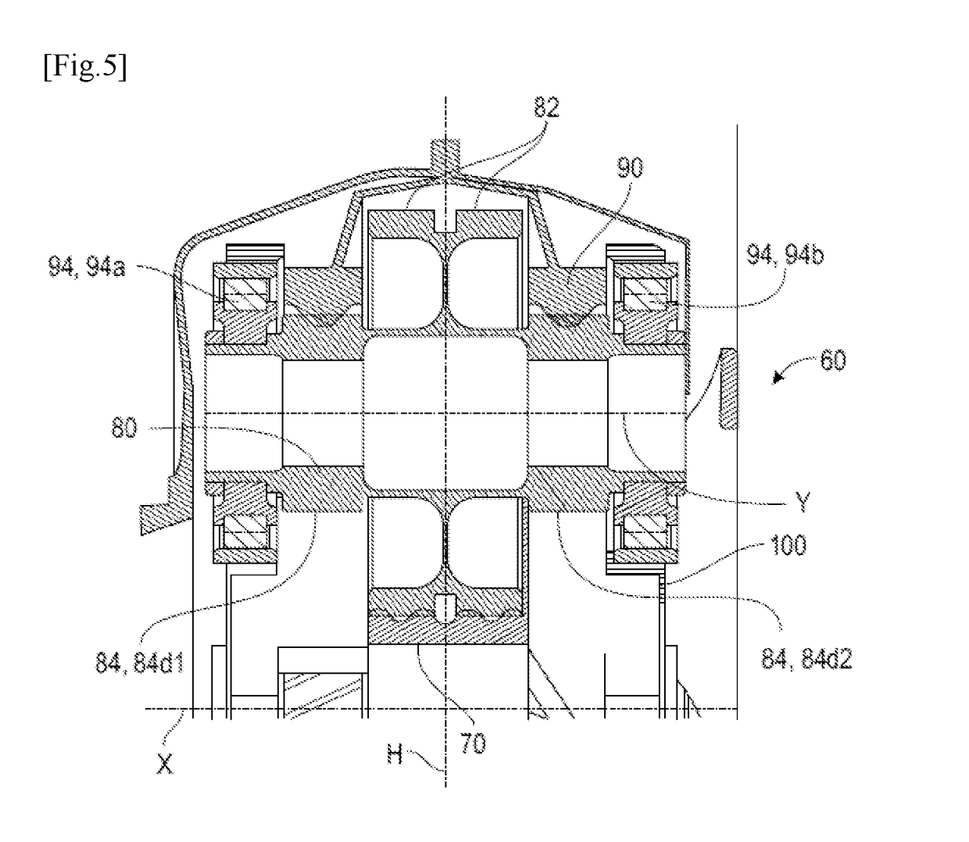
FIG. 5 is a partial axial sectional view of a double-meshing stage mechanical reduction gear, and also illustrates the technique prior to the present invention.
Figure 6:
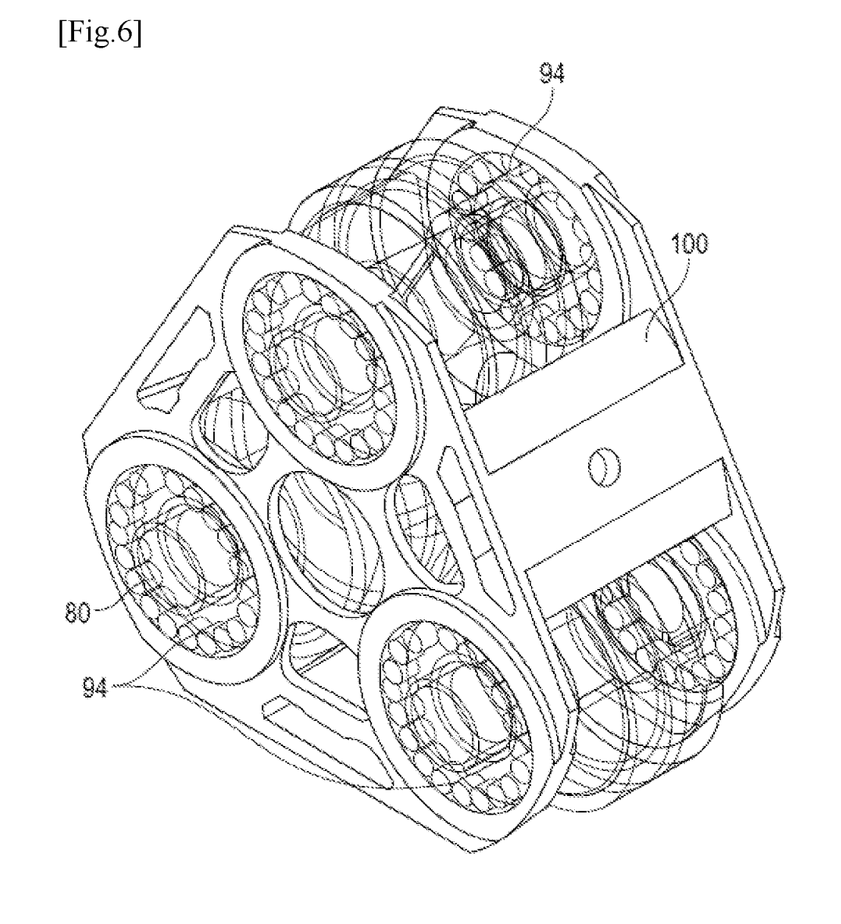
FIG. 6 is a partial perspective view of the reduction gear of FIG. 5.

In this type of architecture, the planet gears 80 are centred and guided in rotation about their axes Y with respect to the planet carrier 100, by bearings 94 which may be plain bearings as in FIGS. 3 and 4 or rolling bearings as shown in FIGS. 5 and 6.

The integration of rolling bearings 94 in a reduction gear 60 is complex as it tends to significantly increase the axial overall dimension and the mass of the reduction gear, which has a significant negative impact on the performance of the engine equipped with this reduction gear.

The invention proposes a solution for the integration of the rolling bearings 94 which enables to overcome these disadvantages.

To this end, the invention proposes to axially interpose an upstream rolling bearing 94a between the upstream teeth 84d1 of the second toothing 84 and the plane H, and a downstream rolling bearing 94b between the downstream teeth 84d2 of the second toothing 84 and the plane H.

Figure 7:
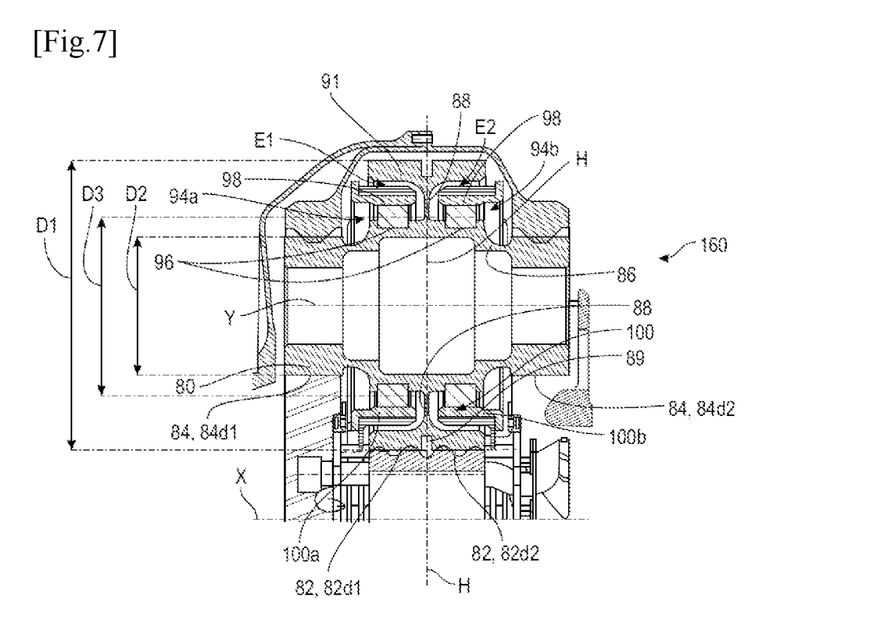
FIG. 7 is a partial axial sectional view of a double-meshing stage mechanical reduction gear, and illustrates a first embodiment of the invention.
Figure 8:
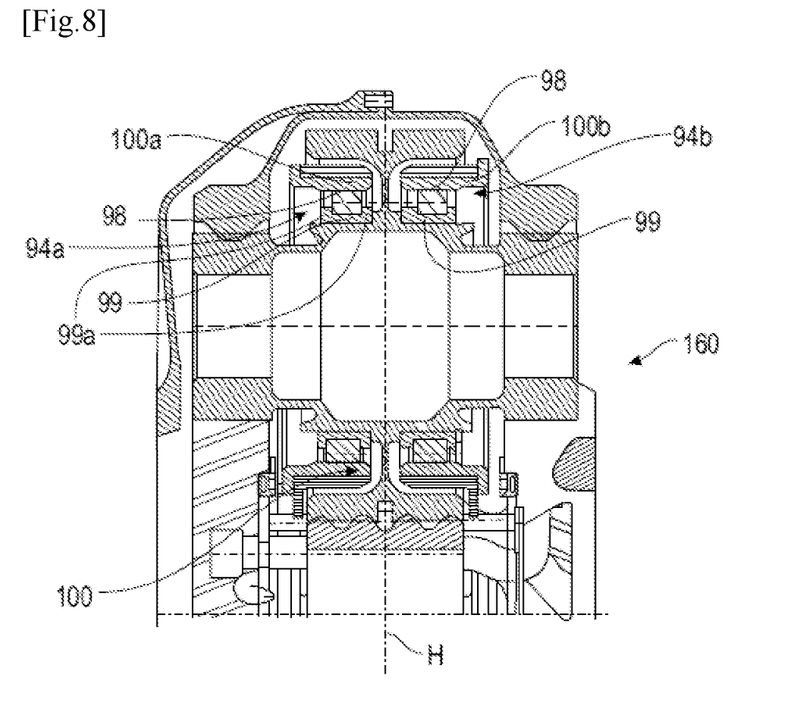
FIG. 8 is a more partial axial sectional view of a double-meshing stage mechanical reduction gear, and illustrates a second embodiment of the invention.
Figure 9:
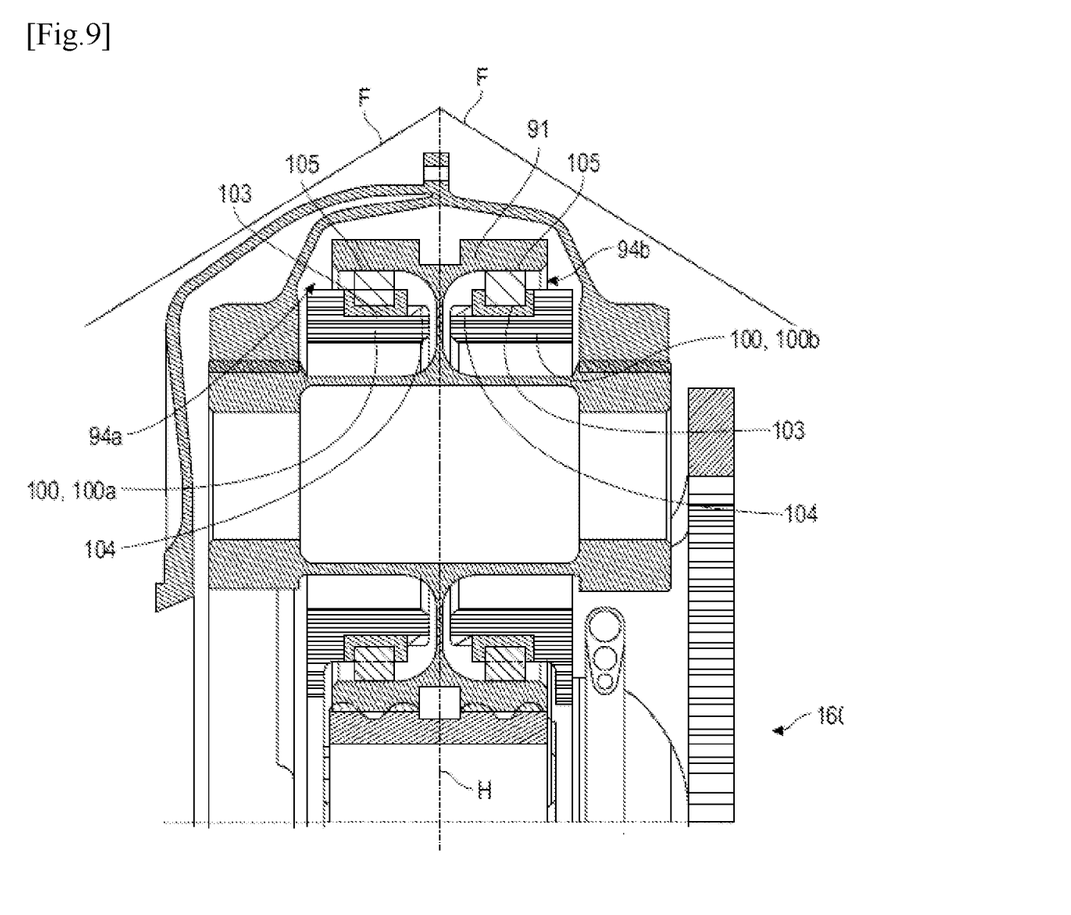
FIG. 9 is a more partial axial sectional view of a double-meshing stage mechanical reduction gear, and illustrates a third embodiment of the invention.

FIGS. 7 to 9 describe three embodiments of the invention.

The elements described in the foregoing in relation to FIGS. 3 to 6 are designated by the same references in FIG. 7 and following. The foregoing description in relation to FIGS. 3 to 6 therefore applies to the embodiments of FIG. 7 and following insofar as it does not contradict or is not superseded by what follows.

In each of the embodiments of FIGS. 7 to 9, the annular wall 91 of each planet gear 80 defines, on either side of the web 88 and of the plane H, and around the body 86 of this planet gear, annular spaces E1, E2 in which the upstream 94a and downstream 94b rolling bearings are at least partially housed.

It is understood that the bearings 94a, 94b are at least partially surrounded by the first toothing 82.

In the examples shown in the drawings, the rolling bearings 94a, 94b are rolling elements and are symmetrical with respect to the plane H.

The rolling bearings 94a, 94b have identical diameters D3 and it is also understood that these diameters D3 are smaller than the diameter D1 of the first toothing 82 and larger than the diameter D2 of the second toothing 84 (see FIG. 7).

In each of the embodiments, the planet carrier 100 comprises two cylindrical edges, respectively upstream 100a and downstream 100b, located on either side of the plane H.

These cylindrical edges 100a, 100b are housed in the annular spaces E1, E2 and serve to support the upstream 94a and downstream 94b rolling bearings, respectively. It is understood that these edges 100a, 100b are at least partially surrounded by the first toothing 82.

In each of the embodiments, the first toothing 82 is herringbone-toothed and the second toothing 84 is herringbone-toothed.

In the first embodiment shown in FIG. 7, each of the rolling bearings 94a, 94b comprises an inner rolling track 96 which is formed in one piece with the planet gear 80 and in particular its body 86. The track 96 comprises an outer cylindrical rolling surface delimited axially by two substantially radial annular surfaces.

Each of these bearings 94a, 94b comprises an outer rolling ring or an outer rolling track 98 which is formed in one piece with the planet carrier 100 and in particular with one of its edges 100a, 100b. This track 98 comprises a simple inner cylindrical surface, the rolling elements of the bearings 94a, 94b being here wedged and held axially by the radial surfaces of the inner track 96.

In the second embodiment shown in FIG. 8, each of the rolling bearings 94a, 94b comprises an inner rolling ring 99 which is fitted and secured (e.g. by shrink fitting) to the planet gear 80 and in particular its body 86. A nut (not shown) may be screwed onto the body 86 to ensure the axial immobilisation of each ring 99 on the body 86.

Each of these bearings 94a, 94b comprises an outer rolling track 98 which is formed in one piece with the planet carrier 100, as discussed in the previous embodiment. The rolling elements of each bearing 94a, 94b may be wedged and held axially by outer annular edges 99a of the inner ring 99.

In the third embodiment shown in FIG. 9, each of the rolling bearings 94a, 94b comprises an inner rolling ring 103 which is fitted and secured to the planet carrier 100 and in particular to its edge 100a, 100b. Each ring 103 is, for example, mounted by sliding on an outer cylindrical surface of this edge 100a, 100b and held axially against an annular shoulder of this edge by a nut 104 screwed onto the edge.

Each of these bearings 94a, 94b comprises an outer rolling track 105 which is formed in one piece with the planet gear 80 and in particular with its wall 91. This track 105 comprises a simple cylindrical inner surface, the rolling elements of the bearings 94a, 94b being wedged and held axially by outer annular edges of the inner ring 103.

Many other alternative embodiments of the bearings are possible and are not all shown, in particular with regard to the integration or the assembly of the bearings in the reduction gear.

Figure 10:
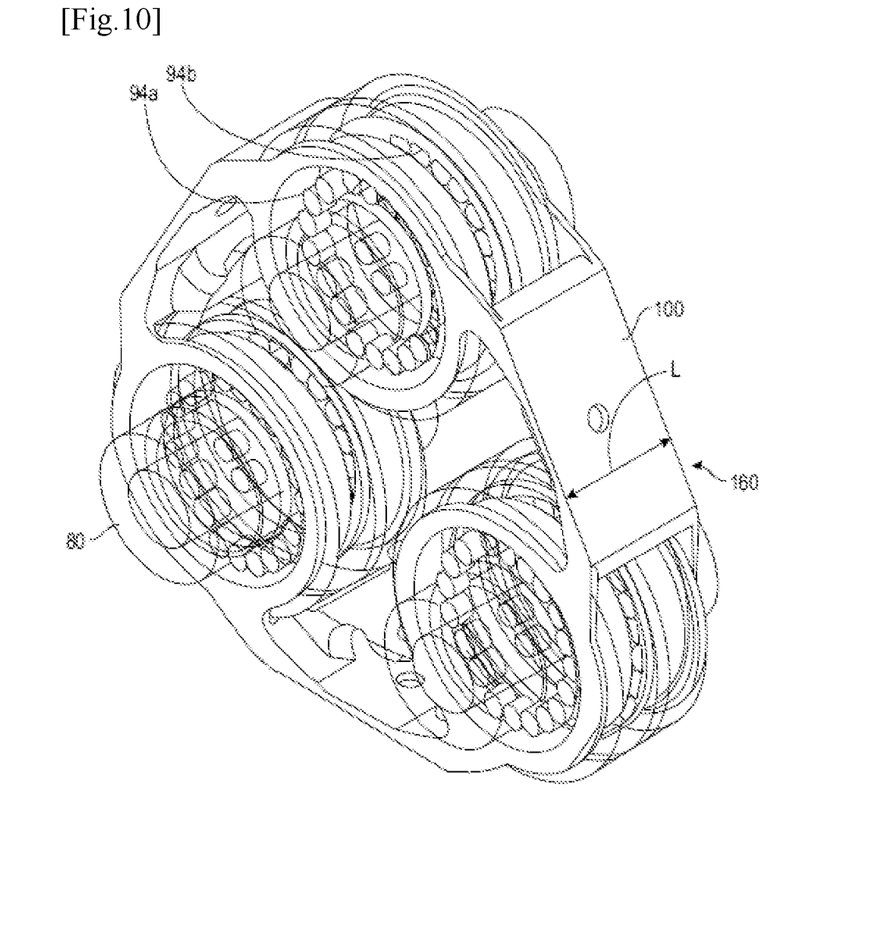
FIG. 10 is a partial perspective view of the reduction gear of FIG. 9.

FIG. 10 is a perspective view of the reduction gear 160 in FIG. 9 and shows in particular the reduced axial dimension L of the planet carrier 100 compared to that of FIG. 6. For example, an axial dimension of the planet carrier 100 is between 20 and 80% of the axial dimension of the planet gears 80.

FIG. 9 shows that the arrangement of the bearings 94a, 94b according to the invention enables to accentuate the biconical shape F of the reduction gear 160 (compared to that of FIGS. 5 and 6), this shape facilitating its integration into the engine. The reduction gear 160 is thus placed in a shell having a generally biconical shape. The reduction gear 160 has a larger transverse dimension at the level of the plane H. The angle formed by the two conical sections of this shape is preferably less than or equal to 150°.

The reduction gear 160 according to the invention is in particular compatible:
- with an "epicyclic" use with rotating planet carrier and fixed ring gear;
- with a "planetary" use with rotating ring gear and fixed planet carrier;
- with a "compound" use with a rotating ring gear and planet carrier.
- with rolling element bearings and also hydrodynamic bearings;
- with a one-piece or multi-part planet carrier.

In an alternative embodiment not shown, at least one of the toothing 82, 84, or both of the toothing 82, 84, of the reduction gear 160 could be straight and not herringbone-toothed.

The invention claimed is:

1. A mechanical reduction gear for a turbomachine, in particular for aircraft, this reduction gear comprising:
    a sun gear having an axis of rotation,
    a ring gear which extends around the sun gear,
    planet gears (80) which are meshed with the sun gear and the ring gear and which are held by a planet carrier, each planet gear having an axis of rotation and comprising a first toothing with a mean diameter D1 for the meshing with the sun gear, and a second toothing with a mean diameter D2, which is different from D1, for the meshing with the ring gear,
    the first toothing comprising a series of upstream teeth and a series of downstream teeth which are located on either side of a plane perpendicular to the axis of rotation of the sun gear and passing substantially through the middle of the planet gear,
    the second toothing comprising a series of upstream teeth and a series of downstream teeth located on either side of said plane and separated from each other by said first toothing,
    each of the planet gears being centred and guided in rotation about its axis with respect to the planet carrier by bearings located on either side of said plane,
    wherein an upstream bearing is interposed axially between the series of upstream teeth of the second toothing and said plane, and a downstream bearing is interposed axially between the series of downstream teeth of the second toothing and said plane.

2. The mechanical reduction gear according to claim 1, wherein each of the planet gears comprises a cylindrical body and an annular wall surrounding this body at a distance and connected to the latter by an annular web of material extending in the aforementioned plane, the series of teeth of the second toothing being located on end portions of said body and the series of teeth of the first toothing being located on the wall, this wall defining, on either side of the web and said plane, annular spaces in which the upstream and downstream bearings are at least partially housed.

3. The mechanical reduction gear according to claim 2, wherein the planet carrier comprises two cylindrical edges, respectively upstream and downstream, located on either side of said plane, these cylindrical edges being housed in said annular spaces and used to support said upstream and downstream bearings.

4. The mechanical reduction gear according to claim 1, wherein said upstream and downstream bearings are rolling bearings.

5. The mechanical reduction gear according to claim 4, wherein each of the upstream and downstream rolling bearings comprises an inner rolling ring or an inner rolling track which is:
    fitted to the planet gear, or
    formed in one piece with the planet gear, or
    fitted to the planet carrier, or
    formed in one piece with the planet carrier.

6. The mechanical reduction gear according to claim 4, wherein each of the upstream and downstream rolling bearings comprises an outer rolling ring or an outer rolling track which is:

fitted to the planet gear, or formed in one piece with the planet gear, or fitted to the planet carrier, or formed in one piece with the planet carrier.

7. The mechanical reduction gear according to claim 6, wherein the outer rolling ring or the outer rolling track of each of the bearings is fitted to or formed in one piece with an annular wall.

8. The mechanical reduction gear according to claim 1, wherein the upstream and downstream bearings have identical diameters which are smaller than the diameter of the first toothing and larger than the diameter of the second toothing.

9. The mechanical reduction gear according to claim 1, wherein the planet carrier has an axial dimension which is between 20 and 80% of the axial dimension of the planet gears.

10. The mechanical reduction gear according to claim 1, wherein the first toothing is herringbone-toothed and the second toothing is herringbone-toothed or straight-toothed.

11. The mechanical reduction gear according to claim 1, wherein it is placed in a shell having a generally biconical shape, the reduction gear having a larger transverse dimension at said plane.

12. A turbomachine, in particular for aircraft, comprising a mechanical reduction gear according to claim 1.

\* \* \* \* \*